United States Patent
Babi et al.

(10) Patent No.: US 7,797,734 B2
(45) Date of Patent: Sep. 14, 2010

(54) SYSTEMS AND METHODS FOR USER INTERFACE CONTROL

(75) Inventors: Rene Pierre Babi, Vancouver, WA (US); Mark Mathias Silbernagel, Battle Ground, WA (US)

(73) Assignee: Aurora Financial Systems, Inc., Greenwich, CT (US)

( * ) Notice: Subject to any disclaimer, the term of this patent is extended or adjusted under 35 U.S.C. 154(b) by 992 days.

(21) Appl. No.: 11/588,371

(22) Filed: Oct. 27, 2006

(65) Prior Publication Data
US 2007/0101411 A1    May 3, 2007

Related U.S. Application Data

(60) Provisional application No. 60/730,382, filed on Oct. 27, 2005.

(51) Int. Cl.
*H04L 9/32* (2006.01)
*H04L 29/06* (2006.01)

(52) U.S. Cl. ............................................. 726/4; 380/33

(58) Field of Classification Search ................. 713/155, 713/168
See application file for complete search history.

(56) References Cited

U.S. PATENT DOCUMENTS

| | | | | |
|---|---|---|---|---|
| 6,061,433 A * | 5/2000 | Polcyn et al. | ............. | 379/93.12 |
| 6,463,130 B1 * | 10/2002 | Malik | ...................... | 379/88.22 |
| 6,711,682 B1 * | 3/2004 | Capps | ........................ | 713/184 |
| 2001/0025259 A1 * | 9/2001 | Rouchon | ...................... | 705/26 |
| 2001/0037211 A1 * | 11/2001 | McNutt et al. | .................. | 705/1 |
| 2001/0040954 A1 * | 11/2001 | Brachman et al. | ....... | 379/211.02 |
| 2003/0023874 A1 * | 1/2003 | Prokupets et al. | ........... | 713/201 |
| 2004/0110495 A1 | 6/2004 | Yanagisawa et al. | | |
| 2006/0053296 A1 * | 3/2006 | Busboom et al. | ............ | 713/182 |

OTHER PUBLICATIONS

International Search Report for PCT/US06/42071, mailed Apr. 24, 2008, 3 pages.

* cited by examiner

*Primary Examiner*—Gilberto Barron, Jr.
*Assistant Examiner*—David Le
(74) *Attorney, Agent, or Firm*—Maryam Imam; IPxLaw Group LLP

(57) ABSTRACT

Enabling and disabling login access to a web-based application by examining automatic number identification (ANI) information from a received telephone call, associating the ANI information with a user account, determining a current state of login access to a web-based application for the user account, the state of login access being one of enabled and disabled, and notifying the web-based application to change the state of login access to the other of enabled and disabled depending on the then-current state of login access. The methodology may further include examining dialed number identification service (DNIS) information of the received call to determine which of the enabling or disabling actions to take, and/or to determine which of a plurality of accounts is to be effected by the desired change in state of login access.

36 Claims, 4 Drawing Sheets

SYSTEMS AND METHODS FOR USER INTERFACE CONTROL

This application claims the benefit of U.S. Provisional application No. 60/730,382, filed Oct. 27, 2005, which is incorporated by reference herein in its entirety.

FIELD OF THE INVENTION

The present invention is related to controlling access to web-based applications. More specifically, the present invention is related to systems and methods for controlling access to web-based applications using out-of-band signaling, and, in particular, telephony networks.

BACKGROUND OF THE INVENTION

As the Internet and World Wide Web become increasingly ubiquitous, people are increasingly transacting business electronically and remotely. Although the convenience of the availability of web-based applications (e.g., online banking, online shopping, online, voting, etc.) is evident, there are also perils associated with increasing reliance on such applications. For example, there is large degree of anonymity in connection with using the Internet. Although a user might identify himself, without hearing his voice, or seeing him in person, one can never be certain that the person on the other end of the electronic communication is precisely who he says he is.

One way to overcome this problem has been to require people to employ unique usernames and passwords that only the authorized user is supposed to know. However, this is not a failsafe methodology in that it can be quite simple to learn (or "hack") someone's supposedly secret credentials.

World Wide Web applications ("web-based applications") often control access by requiring users to enter information (e.g., user name and password) at a login screen. But, as noted above, access to the web-based application could easily be attained by a non-authorized user who has simply gained access to one's username and password.

There is therefore a need to improve security in the web-based applications fields, as well as others.

SUMMARY OF THE INVENTION

Embodiments of the present invention may reduce the likelihood of fraudulent or unauthorized use of a web-based application, typically through an internet browser, by giving the owner, user or account holder, positive control to enable or disable processing of their web login credentials—effectively turning the application 'off' by means of "out of band" signaling—such as through a novel use of telephony. Embodiments of the invention provide an effective implementation of out-of-banding signaling to control access—making it more difficult to compromise application access even if the credentials themselves, user-ID, passwords, or other personally identifiable information, are otherwise available to successfully authenticate and gain access to the application. Although the present invention is described primarily in the context of access to a web-based application, those skilled in the art will appreciate that virtually any electronically controlled access mechanisms may also leverage the methodology and system described herein.

In accordance with one possible embodiment there is provided a method of controlling access to a web-based application including receiving a telephone call at an access system, analyzing call setup information associated with the telephone call, determining from the call setup information whether there is a desire of a user to grant or deny future access to the web-based application, and communicating, from the access system, the desire to grant or to deny access to the web-based application, and thereafter so granting or denying access to the web-based application.

In one aspect of the invention the call setup information comprises automatic number identification (ANI), which may be used to identify and associate an account of the user of the web-based application.

In another aspect of the invention the call setup information further comprises dialed number identification service (DNIS) information, which may include predetermined coding to indicate the desire to grant or to deny access to the web-based application. The DNIS information, may also include an indication of a selected account among a plurality of accounts belonging to a given user.

In still another aspect of the invention, the user or caller may be prompted to enter a password, e.g., via the telephone keypad (i.e., DTMF), to add still another layer of authentication to the overall system.

The telephone call may be initiated from a wired telephone, or a mobile device, such as a mobile telephone.

Among the possible web-based applications with which the instant invention may be applicable are email, online banking, online bill payment, online commerce, online document presentation application, or a secure application allowing only selected access to a predetermined group of people.

In accordance with one possible implementation, the access system is operated by a same entity as the web-based application, although the access system could also be operated by a third party.

After a user successfully changes the state of login access by using his telephone, embodiments of the present invention may confirm the current state of access to the web-based application by providing an interactive voice response (IVR) to the user. Other methods of confirmation may include sending an email, short message, or instant message to the user.

These and other features of the embodiments of the present invention and their attendant advantages will be more fully appreciated upon a reading of the following detailed description in conjunction with following drawings.

DETAILED DESCRIPTION

Figure 1:
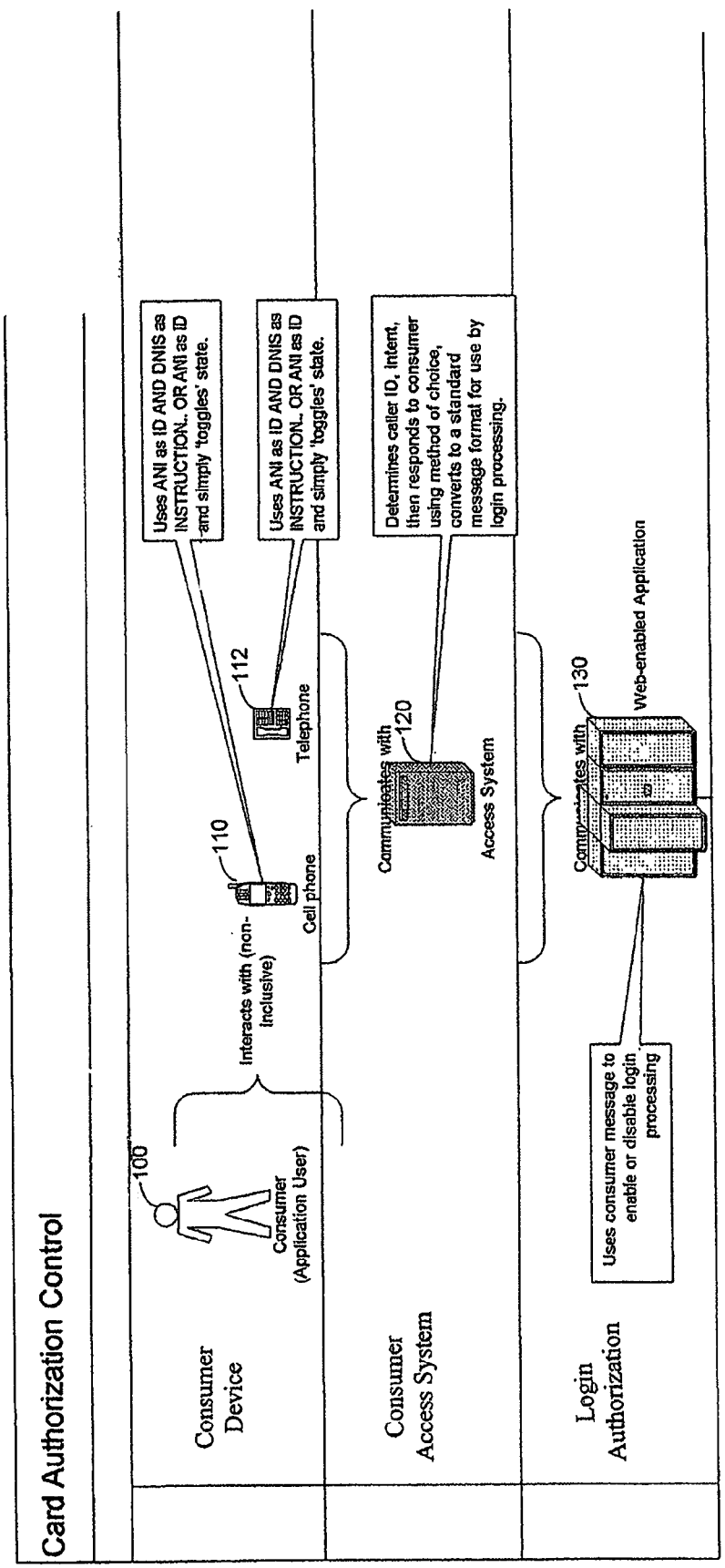
FIG. 1 shows a topology in accordance with an embodiment of the present invention.

Embodiments of the present invention may change the conventional paradigm of "always on" web-based applications, with restrictions for login authorization approval, to an alternative paradigm in which access to the application itself can be reversibly switched 'off' or 'on' by the consumer, at will by the use of telephony methods. Beyond use as a 'top level' means of toggling access to an application, the methodology of the invention could easily be extended to use in toggling access to features or functions within a given application.

Nomenclature

As used within this document, the term "login" is used as an abbreviation and a generalization; however, the term "login" shall be interpreted to comprise various means of presenting and processing user credentials for the purpose of gaining access to a web-enabled or web-based application, such as user IDs, account numbers, passwords, certificates, and PINs.

The term "call setup information," may comprise data elements typically passed from the Public Switched Telephone Network (PSTN) to the called (receiving) party's servicing equipment during that portion of the call immediately prior to the call being answered—also referred to as "call setup" or "handshake."

The term "advanced telephony" may comprise the use of a sequence of key presses (touch tone, or phone pad) which reduce the number of keys which must be pressed to accomplish an intended function. It is similar to the concept of "speed dial". In embodiments of the present invention, a user may make use of this concept by prior arrangement with a telephony carrier to abbreviate the activity required of a consumer as much as possible and thereby increase ease-of-use and simplicity for the consumer.

Centrality

A component of some embodiments of the present invention is the "switch"—that means of "turning off" login processing for a given consumer. The "switch" may be implemented in multiple places.

In some applications, the 'best' instance in terms of utility and effectiveness is to place the 'switch' in the most central place. One example would be within the existing web-enabled application's processing infrastructure. Alternatively, if the application or environment makes use of a more complex access control mechanism, perhaps distributed, switching may be performed at a 'central' location in order to have global effect regardless of the 'geography' or technology of the distributed applications themselves.

More specifically, the present invention may have particular utility with regard to emerging "single sign-on" (SSO) standards. SSO is a specialized form of software authentication that enables a user to authenticate once and gain access to the resources of multiple software systems.

Ease-of-use

In some embodiments of the present invention, the means provided to enable or disable login processing is preferably:

Easy to use

Simple in concept

Fast when applied

Reversible by consumer with a similar effort

Inexpensive

Capable of being 'disarmed' in an emergency, given suitable authentication—possibly through the use of a call center operator.

Tightly integrated between login processing and the public phone network(s).

Embodiments of the present invention preferably provide a greatly simplified method and system which enables the consumer to accomplish his/her objective of easily turning application access (e.g. their login) on or off.

Referring to the Figures, a user 100, uses his cell phone (or mobile device) 110 or wireline telephone 112, to place a call to access system 120. Access system 120, in turn, communicates with web-enabled or web-based application (or, as shown in FIG. 2, "login authorization system) 130, which is responsible for controlling access to the given web-based application, as will be explained in more detail below.

Figure 2:
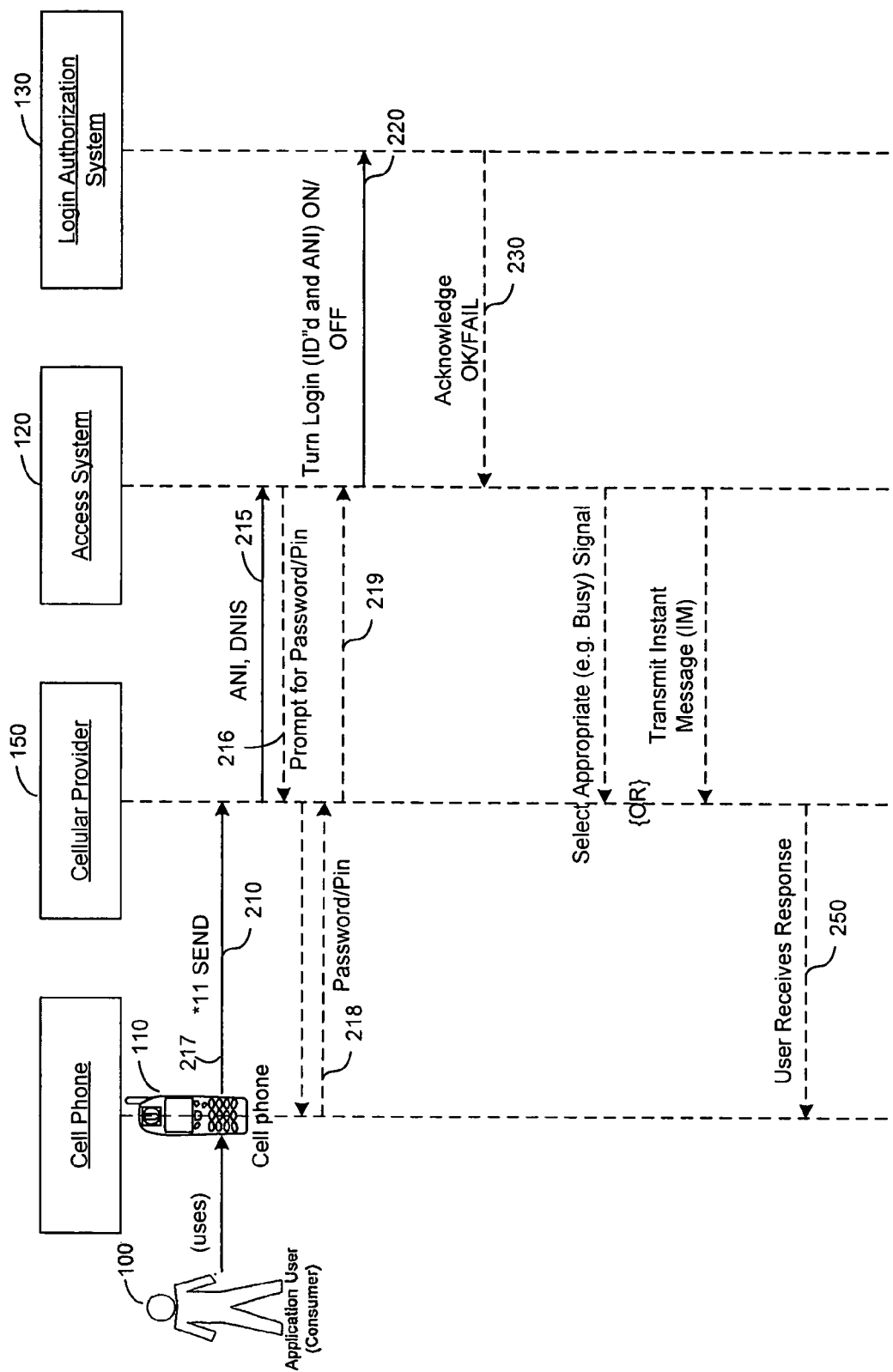
FIG. 2 shows a sequence diagram depicting exemplary steps in accordance with an embodiment of the present invention.

As shown in the sequence diagram of FIG. 2, user 100 makes a call at step 210, which in the case of a mobile call, is serviced by cellular provider 150. At step 215, automatic number identification (ANI) information and dialed number identification service (DNIS) information may be captured or detected, as is well known in the art. This information (or at least the ANI information) is passed to access system 120 as shown. Access system 120, in turn, identifies an account belonging to a given user based on the ANI and sends an enable or disable (or on/off) message to the login authorization system 130, for the appropriate account, at step 220. Optionally, access system 120, upon identification of an account, sends an audible message back to the user 100 at steps 216, 217 that prompts the user to enter a password or personal identification number (PIN) on his phone, which, at steps 218, 219, is passed back to access system 120. This additional password/PIN step converts the basic methodology described herein to two-factor authentication, wherein the user "has" something, namely a phone and associated ANI, and "knows" something, in this case a password or PIN. A password or PIN could also be sent along with the originally-dialed number, thus avoiding the prompting and replying steps. In any event, after the password or PIN is confirmed by access system 120, the enable/disable message step 220 may be performed.

In one possible implementation, the login authorization system 130 acknowledges receipt of the enable/disable message at step 230, which may then trigger the access system 120 to dispatch an appropriate confirmation message back to user 100 in the form of, e.g., a busy signal (step 240) or an electronic message (email, IM, SMS message) (step 245). User 100 actually receives the response at step 250.

Figure 3:
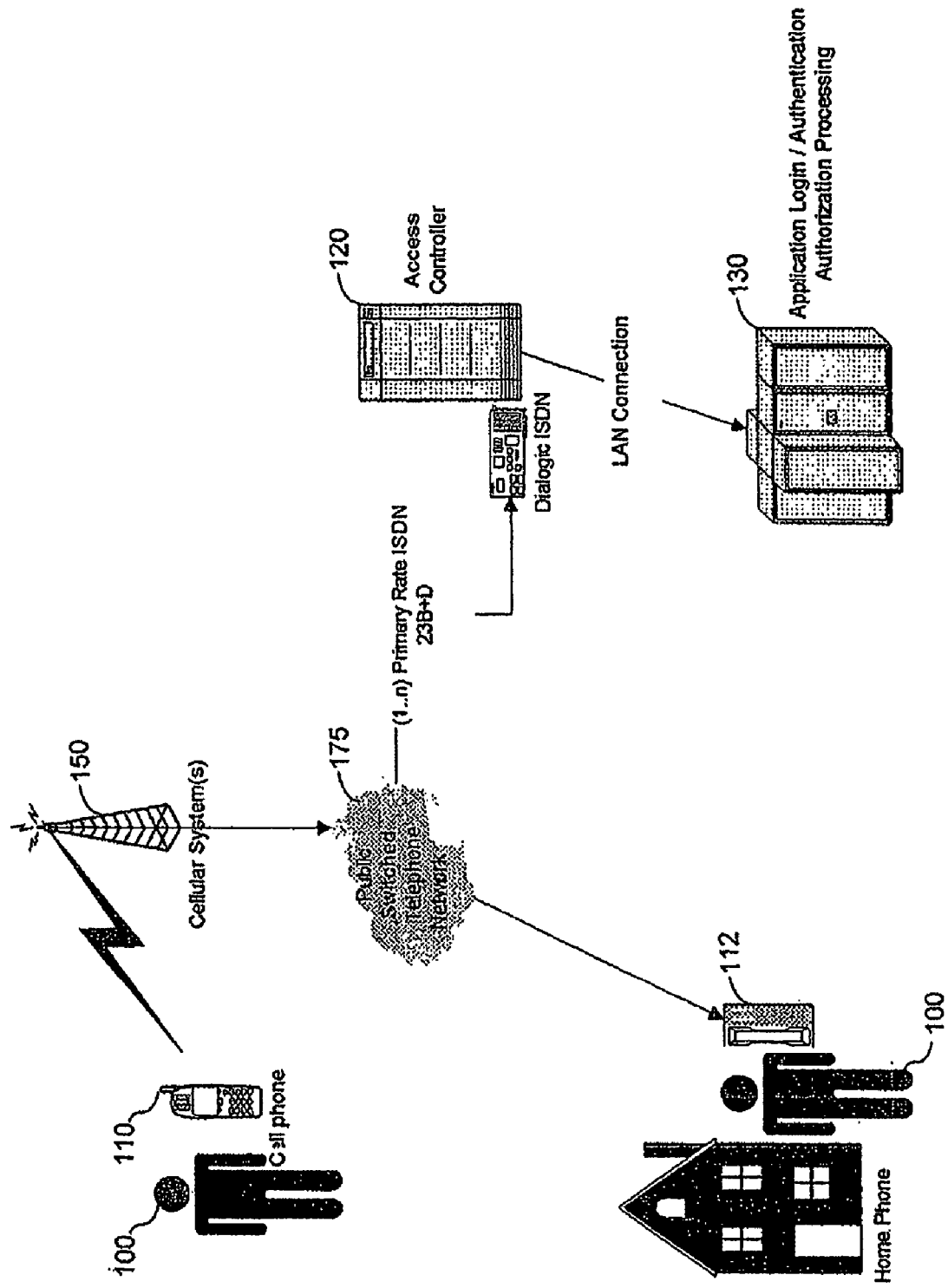
FIG. 3 depicts another topology similar to FIG. 1 in accordance with an embodiment of the present invention.

FIG. 3 shows how the cellular system or provider 150 and wired telephone 112 are ultimately connected to the public switched telephone network (PSTN) 175. Access system or controller 120 is likewise connected to PSTN 175 via, e.g., primary rate ISDN service. Such methods of connectivity are well known in the art. Another possible connection possibility (not expressly shown) is via signaling system seven (SS7), which, as is well known, also supports ANI and DNIS services.

Figure 4:
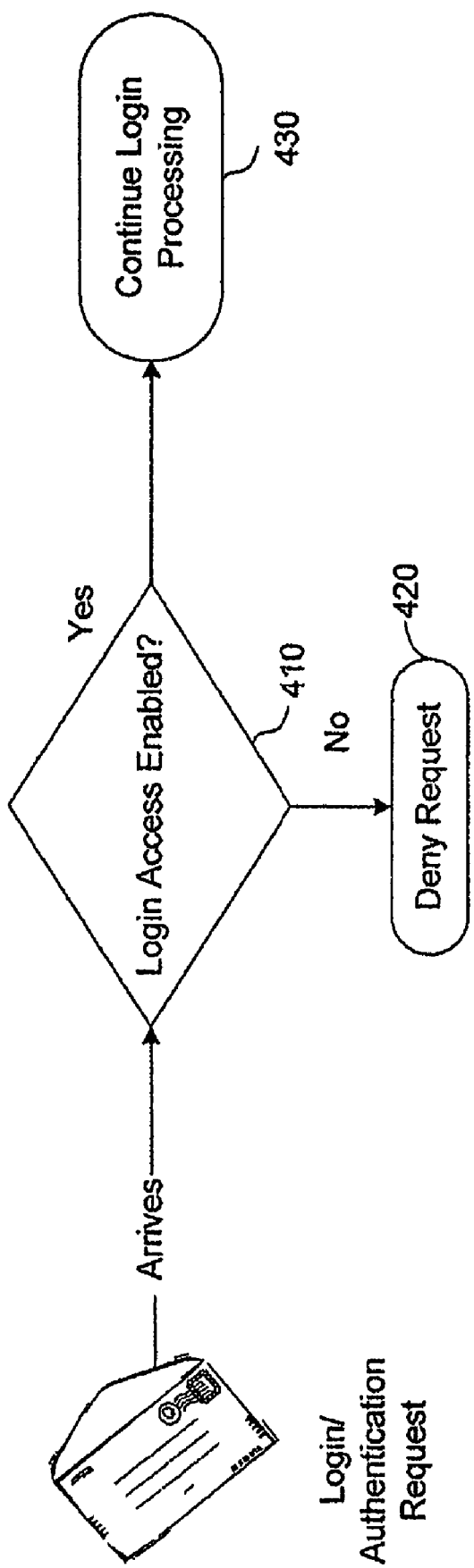
FIG. 4 shows a flowchart depicting several exemplary steps in accordance with an embodiment of the present invention.

FIG. 4 depicts the result of a login/authentication request in accordance with an embodiment of the invention. As shown, when someone tries to login to the web-based application at step 410, and login access has previously been disabled, then the request to login is denied at step 420. If, on the other hand, login access had never been disabled, or was recently re-enabled from being disabled, then the login process is allowed to proceed as shown at step 430. In this way, a user of a web-based application can control access to that application via an "out-of-band" link, namely the telephony system.

In the embodiments of the present invention, an advantage is simplicity for the consumer. To accomplish this, it is preferable to employ tightly coupled integration between the telephony system (call setup information, dial techniques) and the web-based application (account or login ID, authentication). Traditionally, phones are employed by first calling a 'number', where a telephony system answers the call, requiring that the consumer listen to voice prompts, and respond through the use of the phone's keypad, where DTMF (touch tones) are transmitted as keys are pressed and the numbers are translated as instructions such as "Press 1 for On, Press 2 for Off". This is often called Interactive Voice Response (IVR). As will be appreciated from the foregoing, and as will be discussed more fully below, embodiments of the present invention attempt to avoid the complexity and confusion associated with these traditional systems.

In some embodiments, the use of 'speed dial' or an abbreviated sequence of keystrokes to initiate a call to the access system may be used. For example, some embodiments may employ the use of a cell (or phone) provider's 'custom' sequence, such as *11 for ON and *22 for OFF, or 111 for ON and 222 for OFF, etc. This information may be gleaned from the DNIS information captured at call inception.

In alternative embodiments, a custom sequence, as may be used as a PRE-fix, appending a reference number indicating which of the login account numbers of possibly multiple login accounts associated with the caller's phone number is being turned on or off. For example, *113 might turn ON the third login entry in a consumer maintained list of login/accounts. The exact numbers are less important than keeping the sequence short and simple, though the use of mnemonic combinations may be helpful. And, again, a password or PIN may be incorporated into such originally-dialed numbers.

Using call setup information for this task may accomplish several things, including:

Directing the cell or phone system provider to route the call to the access system using the pre-determined 'shortcut', or sequence of dialed numbers;

Determining the consumer's intent to turn the login ON or OFF using the called number (sequence), specifically through the use of DNIS as passed during call setup;

Identifying which login is being addressed by the user through the use of the call originator's phone number, specifically through the use of ANI as passed during call setup; and Making use of advanced telephony techniques to communicate this information to the access system without further effort from the consumer, and specifically, to transmit call setup information available, making use of ISDN (best case) at the access controller to capture various information, including:

DNIS (the 'TO' number being dialed (*11, *22, 111, 222, etc), to determine whether the consumer wants "ON" or "OFF"

ANI (FROM number, to determine who is calling), which uniquely identifies the consumer to the access system, and consists of calling party's phone number, transmitted by the phone system (carriers) in the form of ANI. ANI is preferable to, e.g., CALLER-ID, in that it is possible to exploit various means to manipulate or block the Caller ID whereas ANI is a carrier managed component.

In this way, the information required to accomplish the consumer's request can be obtained before the first ring.

Through the telephonic (e.g. ISDN) response given in response to the call setup request, a signal can be issued to indicate the call has accomplished a state change for the login. A busy signal (see step 240 of FIG. 2) would be permitted, for example, while a continued ringing or other (reorder) signal would indicate that the task was not successfully completed. The use of busy or reorder signaling could be chosen to communicate status and reduce the possibility of confusion, as much as possible and allowable.

Alternatively, to more clearly communicate the results of the 'call' to change state, informing the consumer and confirming the login's new state, an "instant message" (IM) (or other form of electronic message, as shown in FIG. 2) could be sent indicating the login's (now) current state. For instance the call could be answered and a short message 'played' to indicate the login's new state. Yet another alternative, mentioned previously, is that of sending an e-mail to indicate the login's (now) current state.

Some embodiments may provide an alternative, audibly distinctive response when the call setup information is processed such that the IM (or other confirmation vehicle) was unnecessary.

It should be appreciated by those skilled in the art that use of a custom dialing sequence may require cooperation from the telephony/cellular system provider. Alternatively, pre-programmed speed-dial may be used. The custom sequences have the benefit of simplicity for non-sophisticated users.

Referring again to FIG. 2, the user 100, uses, e.g., the cell phone 110 to send a uniquely-crafted message to the cellular provider/partner 150, which partner 150 initiates a call, during which call initiation the setup message (step 215) is transmitted to Access System 120, which interprets the caller's cell phone number (ANI) as either an account number or a means to look up an actual login in a table previously constructed for that purpose, and which (optionally) interprets the caller's dialed number (DNIS) as an indication that the consumer wishes the login enabled or disabled. The user may then be prompted for a password or PIN. Then, the Access System 120 forwards a message in a standard communications method and protocol (such as HTTPS—secure/encrypted http) using a standard messaging technique (XML/SOAP) to the Authorization System 130, for subsequent lookup and response (step 230) back to the Access System 120, which indicates the outcome of the processing of message. The Access System 120 then employs an 'in-channel' response to the user of a standard network response such as a busy signal (step 240), or alternatively an out-of-band response using, e.g., Instant Messaging (IM, step 245), at which point the cellular provider 150 forwards the message (of steps 240, 245) to the consumer's phone 110 for receipt by the consumer 100, at step 250.

Exemplary Applications of Embodiments of the Invention

An exemplary, non-limiting, practical application for the present invention is to provide the capability for a user to turn OFF the ability to log into the user's Internet email account (e.g., JoeSmith@Yahoo.com). In accordance with the principles of the present invention, the user 100 calls a predetermined number that reaches the access system 120 and causes access to the email account to be turned OFF (or back ON). As a result, even if an unauthorized user surreptitiously obtains the user's correct username and password for login purposes, the login request will be denied (assuming access has been turned OFF), as shown in FIG. 4.

Other non-limiting examples where the present invention might be of particular utility include online banking, online bill pay applications, web-based ordering screens, secure sites for vendors to view RFP/RFQ/RFI documents and respond securely, etc. These types of websites (or internet sites generally, i.e., not limited to the World Wide Web) all have in common the need for the average user to produce credentials to gain access to an Internet-based service. Embodiments of the present invention, through a novel use of telephony, enable or disable (turn ON or OFF) the ability of those credentials to access the account, thereby adding yet another level of security to these sites.

In addition to web-based applications, the present invention has utility in controlling access mechanisms. For example, the methods and systems described herein could be used to enable an access card just before the card is used to pass through a gate or doorway. the access control of the present invention could also be used to toggle home or business alarms. It is also contemplated that one may use the system to control access to a vehicle by toggling a "kill" switch remotely. This could be accomplished by having the vehicle be configured to have a cellular or other RF receiver. This functionality could also be coordinated with services such as OnStar™.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of controlling access to a web-based application, comprising:
   receiving a telephone call from a user at an access system, the telephone call having associated therewith call setup information;
   identifying a web-based user account associated with the user based on the call setup information;
   determining from said call setup information whether there is a desire of the user to grant or deny future access to a web-based application associated with the web-based user account;
   sending an on/off message to a login authorization system for the user account based on the user's desire to grant or deny future access to the web-based application;
   acknowledging receipt of the on/off message;
   dispatching a confirmation message back to the user to confirm receipt of the on/off message; and
   granting or denying access, depending on the user's desire, to the web-based application, wherein access to the web-based application is controlled using an out-of-band link.

2. The method of claim 1, wherein the call setup information comprises automatic number identification (ANI).

3. The method of claim 2, further comprising correlating the ANI information with the user's account associated with the web-based application.

4. The method of claim 1, wherein the call setup information comprises dialed number identification service (DNIS).

5. The method of claim 4, wherein the DNIS information includes predetermined coding to indicate the desire to grant or to deny access to the web-based application.

6. The method of claim 5, wherein the DNIS information includes an indication of a selected account among a plurality of accounts associated with a given user.

7. The method of claim 1, further comprising receiving a password or PIN during the telephone call.

8. The method of claim 1, wherein the web-based application is an email application.

9. The method of claim 1, wherein the web-based application is an on-line banking application.

10. The method of claim 1, wherein the web-based application is an on-line bill payment application.

11. The method of claim 1, wherein the web-based application is a on-line commerce application.

12. The method of claim 1, wherein the web-based application is one of a document presentation application and secure application allowing only selected access to a predetermined group of people.

13. The method of claim 1, wherein the access system is operated by a same entity as the web-based application.

14. The method of claim 1, further comprising confirming a current state of access to the web-based application by operating an interactive voice response (IVR) system to which a user gains access upon placing the telephone call.

15. The method of claim 1, wherein the confirmation message back to the user is in the form of a signal or an electronic message.

16. The method of claim 1, wherein the telephone call is initiated from a wired telephone.

17. The method of claim 1, wherein the telephone call is initiated from a mobile device.

18. The method of claim 17, wherein the telephone call is initiated from a mobile telephone.

19. The method of claim 1, further comprising receiving a login request by the web-based application and one of granting and denying login based on the desire of the user to grant or deny future access as previously detected.

20. A method of controlling access to a feature of a web-based application from a non-web-based system, comprising:
   capturing automatic number identification (ANI) and dialed number information service (DNIS) from a telephone call placed to an access system, the telephone call having been initiated by a user;
   identifying a web-based account of the user that is associated with the web-based application based on the ANI information;
   receiving a password or PIN associated with the web-based account;
   determining from the DNIS information whether to grant or deny future access to at least a feature of the web-based application;
   notifying the web-based application with a notification message, from the access system, of one of to grant and to deny future access to at least a feature of the web-based application;
   receiving an acknowledgment, at the access system, from the web-based application of receipt of the notification message; and
   sending a response message from the access system to the user indicative of the acknowledgement.

21. The method of claim 20, wherein the web-based application is an email application.

22. The method of claim 20, wherein the web-based application is an on-line banking application.

23. The method of claim 20, wherein the web-based application is an on-line bill payment application.

24. The method of claim 20, wherein the web-based application is a on-line commerce application.

25. The method of claim 20, wherein the web-based application is a document presentation application.

26. The method of claim 20, wherein the web-based application is a secure application allowing only selected access to a predetermined group of people.

27. The method of claim 20, wherein the at least one feature of the web-based application is a login process.

28. The method of claim 20, wherein the access system is operated by a same entity as the web-based application.

29. The method of claim 20, wherein the response message is delivered using an interactive voice response (IVR) system to which the user gains access upon placing the telephone call.

30. The method of claim 20, wherein the response message is delivered via email.

31. The method of claim 20, wherein the response message is delivered by a short text message.

32. The method of claim 20, wherein the response message is delivered via instant message.

33. The method of claim 20, wherein the telephone call is initiated from a wired telephone.

34. The method of claim 20, wherein the telephone call is initiated from a mobile device.

35. The method of claim 34, wherein the telephone call is initiated from a mobile telephone.

36. The method of claim 1, wherein upon identification of the user account, sending an audible message back to the user to prompt the user to enter a password or personal identification number (PIN) on the user's telephone for use by the access system and after the sending of an audible message step, performing the sending of an on/off message step.

* * * * *